Figure 1:
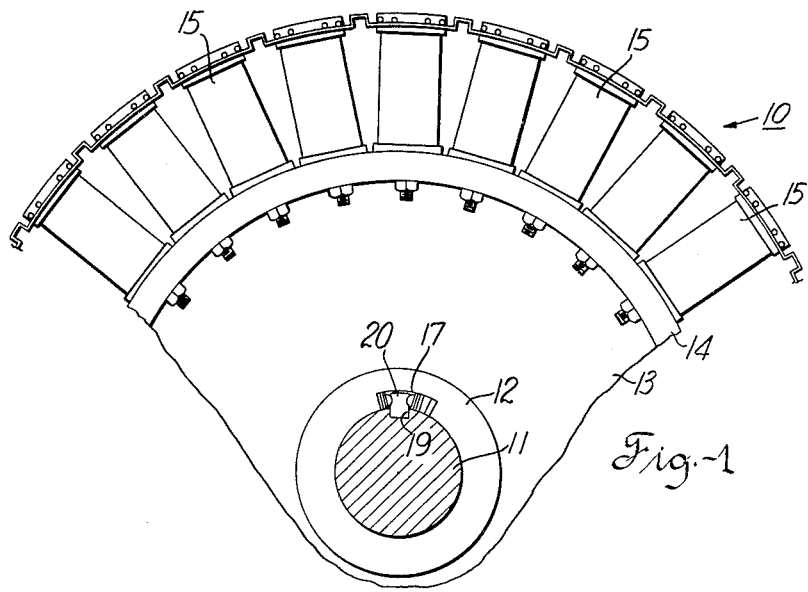

United States Patent Office 3,187,213
Patented June 1, 1965

3,187,213
ROTOR SHIFTING MECHANISM
Alois C. Seidl, Wauwatosa, and Frank Walker, New Berlin, Wis., assignors to Allis-Chalmers Manufacturing Company, Milwaukee, Wis.
Filed Apr. 12, 1962, Ser. No. 186,973
6 Claims. (Cl. 310—209)

This invention relates generally to synchronous dynamoelectric machines. More specifically this invention relates to the paralleling of a plurality of synchronous machines coupled to a single power transmission element.

When utilizing a plurality of synchronous dynamoelectric machines that are coupled to a single, power transmitting or receiving element, the synchronous machines must operate in parallel to divide the load equally. To insure that the machines are operating in parallel and dividing the load equally all the machines must bear the same phase relationship between their rotor and stator. It is difficult to build machines that when put in operation will have the same phase relationship between the rotor and the stator. Furthermore, machines often get out of phase after being in service due to wear on the power transmitting components.

In the past, synchronous machines were paralleled by shifting the stator relative to the rotor. Paralleling synchronous machines by this method is costly and time consuming. For example, one way of paralleling motors is to provide the stator with a rotatable cradle frame. This requires a special cradle and bedplate in an oversized housing to enclose the stator cradle frame. The result of these special items increases the overall size and cost of the machine and though paralleling becomes possible it remains difficult.

The adjusting device of this invention overcomes the problems mentioned above by providing a simple, inexpensive means for shifting the rotor on its shaft and hence change its position relative to the stator. This is accomplished by providing an oversize keyway in the hub and a driving key with various size parallel spacers on either side within the keyway in the hub to fill the keyway and provide torque transmission means. This makes possible a change of the phase relationship between the rotor and the stator by merely switching some of the spacers from one side of the driving key to the other thereby varying the angular position of the rotor relative to the shaft. Furthermore, the phase adjusting device and the torque transmitting components are contained entirely within the axial extent of the hub thereby providing a very compact design. This is a simple, inexpensive means of changing the phase relationship of the rotor and stator.

Therefore, it is an object of this invention to provide a new and improved synchronous dynamoelectric machine.

Another object of this invention is to provide a synchronous dynamoelectric machine having new and improved means for changing the phase relationship between the rotor and the stator.

Another object of this invention is to provide a new and improved synchronous dynamoelectric machine having simpler means for paralleling the machine with other synchronous dynamoelectric machines.

Figure 2:
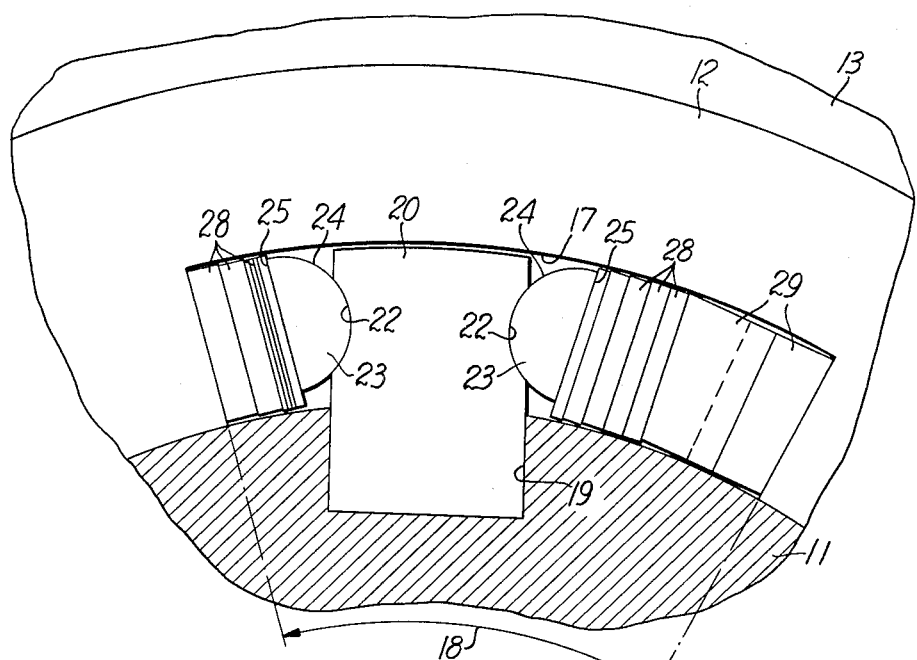

Other objects and advantages of this invention will be apparent from the following description when read in connection with the accompanying drawings, in which:

FIG. 1 is a partial end view of a rotor of a dynamoelectric machine embodying this invention; and FIG. 2 is an enlarged view of the phase adjusting mechanisms of this invention.

Referring more specifically to the drawings by characters of reference, the rotor 10 of a synchronous dynamoelectric machine is mounted on a shaft 11. The rotor comprises a hub 12, a spider 13 and a coil mounting plate 14 having coils 15 mounted thereon. The hub 12 has a slight slip clearance fit on the shaft 11 and is provided with a longitudinally extending keyway 17. If necessary, other means such as a key are provided to take up the slight diametrical clearance and wedge the rotor hub to the shaft.

The shaft 11 is provided with a longitudinally extending keyway 19 and a driving key 20 positioned therein and extends radially outward into the keyway 17 of the hub 12.

One of the keyways 17, 19 is designed to snugly receive the driving key 20 and the other keyway is oversized. By that we mean that it has a larger arcuate expanse than the smaller keyway. Preferably as shown in the drawings, the hub keyway 17 has the larger arcuate expanse 18 and the key 20 is snugly fitted into the shaft keyway 19.

As clearly illustrated in FIG. 2, the key 20 is provided with longitudinally extending arcuate grooves 22 on either side of the portion of the key extending into the keyway 17 in the hub. Half round bars 23 have a curved surface 24 which complements the curved surface of the longitudinally extending grooves 22 and are positioned on either side of the key with the curved surface of the half round bars fitting into the grooves and the flat surfaces 25 facing the sides of the hub keyway 17. A number of spacers 28 of various thicknesses are inserted between the flat side of the bars and the side wall of the keyway 17 on either side of the key. The curved surface 24 of the bar 23 is seated in the arcuate grooves 22 to allow the bars to pivot and thereby position its flat surface 25 flush against the spacers 28 regardless of the number of spacers on either side of the key 20. Hence, any parallel sided member can be used as a spacer and the entire mating surfaces of adjacent members will be in full contact with each other to more equally distribute the force being transmitted from the shaft to the hub. Also included on one side of the key between the spacers 28 and the end of the keyway 17 are a pair of complementary tapered keys 29. These keys 29 serve to tighten the fit between the driving key 20 and the hub keyway 17. If necessary, other means such as a key are provided to take up the slight diametrical clearance and wedge the rotor hub to the shaft.

When it is desired to change the phase relationship between the rotor and the stator, the tapered keys are withdrawn and the spacers are changed from one side to the other depending on the direction the rotor is to be moved relative to the shaft.

In operation, if the dynamoelectric machine is out of phase relative to another machine with which it is supposed to be operating in parallel, the number of degrees that it is out of phase is determined. The machine is then shut down and the tapered keys are removed. It is then determined how far the hub has to be moved relative to the driving shaft to change the phase relationship to the desired value. Spacers are then changed from one side of the key 20 to the other until the desired change is accomplished. For example, if it is desired to move the hub clockwise relative to the shaft (referring to the drawings) a number of spacers are removed from the left hand side of the key equal to the distance it is desired to move the hub relative to the shaft, then the hub is moved in a clockwise direction until there is no space between the key and the left side of the hub keyway. Then spacers are inserted on the other side, or right side, of the keyway, the tapered keys are reinserted and driven up tight. If necessary, other means such as a key are provided to take up the slight diametrical clearance and wedge the rotor hub to the shaft. This will have adjusted the position of the rotor relative to its stator and other rotors connected to the same power transmission device and will bring the phase relationship of this machine into accord with the other paralleled dynamoelectric machine.

Although but one embodiment has been illustrated and described, it will be apparent to those skilled in the art that various changes and modifications may be made therein without departing from the spirit of the invention or from the scope of the appended claims.

Having now particularly described and ascertained the nature of our said invention and the manner in which it is to be performed, we declare that what we claim is:

1. An adjusting device for paralleling synchronous dynamoelectric machines comprising: a shaft having a longitudinally extending keyway in its external surface, a rotor having a hub mounted on said shaft with slip clearance therebetween, the bore of said hub having an axially extending keyway, one of said keyways having a greater arcuate length than the other said keyway, a driving key snugly fitted into the smaller of said keyways and extending into the larger said keyway, and means associated with said driving key for adjusting the angular position of said rotor relative to said shaft, said adjusting means comprising a plurality of various thickness spacers positioned within said larger keyway on either side of said key, and wedge means positioned between said driving key and one side wall of said larger keyway to fill said larger keyway and prevent relative angular movement between said rotor and said shaft and to provide means for transmitting torque between said shaft and said rotor.

2. An adjusting device for paralleling synchronous dynamoelectric machines comprising: a shaft having a longitudinally extending keyway in its external surface, a rotor having a hub mounted on said shaft with slip clearance therebetween, said hub having a bore with an axially extending keyway defined therein, said hub keyway having a greater arcuate length than the arcuate length of said keyway in said shaft, a driving key snugly fitted into said shaft keyway and extending into said hub keyway, and means associated with said driving key for adjusting the angular position of said rotor relative to said shaft, said adjusting means comprising a plurality of various thickness spacers positioned within said hub keyway on either side of said key to prevent relative angular movement between said rotor and said shaft and to provide means for transmitting torque between said shaft and said rotor.

3. An adjusting device for paralleling synchronous dynamoelectric machines comprising: a shaft having a longitudinally extending keyway in its external surface, a rotor having a hub mounted on said shaft with slip clearance therebetween, the bore of said hub having an axially extending keyway having a greater arcuate length than the arcuate length of said keyway in said shaft, a driving key snugly fitted into said shaft keyway and extending into said hub keyway, and means associated with said driving key for adjusting the angular position of said rotor relative to said shaft, said adjusting means comprising a plurality of various thickness spacers positioned within said hub keyway on either side of said key, means for wedging said spacers in said hub keyway to prevent relative angular movement between said rotor and said shaft and to provide means for transmitting torque between said shaft and said rotor.

4. An adjusting device for paralleling synchronous dynamoelectric machines comprising: a shaft having a longitudinally extending keyway in its external surface, a rotor having a hub mounted on said shaft with slip clearance therebetween, the bore of said hub having an axially extending keyway having a greater arcuate length than the arcuate length of said keyway in said shaft, a driving key sungly fitted into said shaft keyway and extending into said hub keyway, and means associated with said driving key for adjusting the angular position of said rotor relative to said shaft, said adjusting means comprising a plurality of various thickness spacers positioned within said hub keyway on either side of said key, and a pair of complementary tapered keys positioned between said driving key and one end of said hub keyway to fill said keyway and prevent relative angular movement between said rotor and shaft and to provide means for transmitting torque between said shaft and said rotor.

5. An adjusting device for paralleling synchronous dynamoelectric machines comprising: a shaft having a longitudinally extending keyway in its external surface, a rotor having a hub mounted on said shaft with slip clearance therebetween, the bore of said hub having an axially extending keyway having a greater arcuate length than the arcuate length of said keyway in said shaft, a driving key snugly fitted into said shaft keyway and extending into said hub keyway, the extended portion of said key having a longitudinally extending arcuate shaped groove on both sides and means associated with said driving key for adjusting the angular position of said rotor relative to said shaft, said adjusting means comprising half round bars having a curved surface positioned in said grooves and a flat surface facing the sides of said grooves, a plurality of various thickness spacers positioned within said hub keyway on either side of said bars to fill said keyway and prevent relative angular movement between said rotor and said shaft and to provide means for transmitting torque between said shaft and said rotor.

6. An adjusting device for paralleling synchronous dynamoelectric machines comprising: a shaft having a longitudinally extending keyway in its external surface, a rotor having a hub mounted on said shaft with slip clearance therebetween, the bore of said hub having an axially extending keyway having a greater arcuate length than the arcuate length of said keyway in said shaft, a driving key snugly fitted into said shaft keyway and extending into said hub keyway, the extended portion of said key having a longitudinally extending arcuate shaped groove on both sides and means associated with said driving key for adjusting the angular position of said rotor relative to said shaft, said adjusting means comprising half round bars having a curved surface positioned in said grooves and a flat surface facing the sides of said grooves, a plurality of various thickness spacers positioned within said hub keyway on either side of said key, and a pair of complementary tapered keys positioned between said driving key and one end of said hub keyway to fill said keyway and prevent relative angular movement between said rotor and shaft and to provide means for transmitting torque between said shaft and said rotor.

References Cited by the Examiner

UNITED STATES PATENTS

| 1,043,116 | 11/12 | Lee | 310—79 X |
| 2,088,330 | 7/37 | Madsen | 287—52.05 |
| 2,277,331 | 3/42 | Kysor | 287—52.05 |
| 3,005,120 | 10/61 | Cart | 310—209 |

MILTON O. HIRSHFIELD, *Primary Examiner.*